(12) United States Patent
Zhang et al.

(10) Patent No.: US 12,486,640 B2
(45) Date of Patent: Dec. 2, 2025

(54) UNDERWATER LAYING DEVICE FOR OFFSHORE OIL AND GAS PIPELINES AND LAYING METHOD THEREOF

(71) Applicant: JIANGSU UNIVERSITY OF SCIENCE AND TECHNOLOGY, Jiangsu (CN)

(72) Inventors: Jing Zhang, Jiangsu (CN); Xinghua Shi, Jiangsu (CN); Peilin Dou, Jiangsu (CN); Jian Sun, Jiangsu (CN); Kefeng Liu, Jiangsu (CN); Wanchao Zhang, Jiangsu (CN)

(73) Assignee: JIANGSU UNIVERSITY OF SCIENCE AND TECHNOLOGY, Jiangsu (CN)

( * ) Notice: Subject to any disclaimer, the term of this patent is extended or adjusted under 35 U.S.C. 154(b) by 881 days.

(21) Appl. No.: 17/282,768

(22) PCT Filed: Sep. 27, 2020

(86) PCT No.: PCT/CN2020/118020
§ 371 (c)(1),
(2) Date: Apr. 4, 2021

(87) PCT Pub. No.: WO2021/088562
PCT Pub. Date: May 14, 2021

(65) Prior Publication Data
US 2025/0290276 A1    Sep. 18, 2025

(30) Foreign Application Priority Data
Nov. 6, 2019 (CN) .......................... 201911075157.X

(51) Int. Cl.
*E02F 5/10* (2006.01)
*F16L 1/16* (2006.01)

(52) U.S. Cl.
CPC .............. *E02F 5/105* (2013.01); *E02F 5/106* (2013.01); *F16L 1/165* (2013.01)

(58) Field of Classification Search
CPC ...... E02F 5/104–106; F16L 1/16; F16L 1/165
(Continued)

(56) References Cited

U.S. PATENT DOCUMENTS 3,898,852 A * 8/1975 Ezoe et al. .............. E02F 5/106
405/164
4,129,992 A * 12/1978 Carlsson et al. ........ E02F 5/106
405/164

(Continued)

FOREIGN PATENT DOCUMENTS

CN       85103961 A      12/1986
CN      201874025 U       6/2011
(Continued)

OTHER PUBLICATIONS

International Search Report and Written Opinion for PCT/CN2020/118020 dated Jan. 4, 2021.

*Primary Examiner* — Tara Mayo
(74) *Attorney, Agent, or Firm* — JC ONE WORLD

(57) ABSTRACT

Disclosed is an underwater laying device for offshore oil and gas pipelines. By using a steel cuboid as the main body, a first mud-plowing rake, a first mud-plowing hoe, a second mud-plowing rake, a second mud-plowing hoe, and a mud delivery plate are disposed on the lower surface of the cuboid main body. Further, by cooperation of a mud collection hood and an elongated pipeline-delivery cylinder, and according to structural characteristics of traditional farming tools, submarine trenching, pipeline laying, and pipeline burying can be successively performed and all implemented by the device of the present invention. Further disclosed is a pipeline laying method of the device of the present invention. The device of the present invention has a simple (Continued)

structure, and overcomes the structural complexity of the conventional underwater robot on the premise of achieving the function requirements, thus greatly reducing the manufacturing cost and being mass-producible.

10 Claims, 6 Drawing Sheets

(58) Field of Classification Search
USPC .......................................................... 405/158
See application file for complete search history.

(56) References Cited

U.S. PATENT DOCUMENTS

| | | | | |
|---|---|---|---|---|
| 4,588,329 | A * | 5/1986 | Gilchrist, Jr. ........... | E02F 5/105 |
| | | | | 405/141 |
| 4,896,998 | A * | 1/1990 | Reece ....................... | F16L 1/12 |
| | | | | 405/160 |
| 4,992,000 | A * | 2/1991 | Doleshal ................. | E02F 5/108 |
| | | | | 405/164 |
| 10,597,849 | B2 * | 3/2020 | Serena et al. ............. | F16L 1/23 |
| 2012/0057940 | A1 * | 3/2012 | Lazzarin et al. ...... | E02D 17/086 |
| | | | | 405/284 |

FOREIGN PATENT DOCUMENTS

| | | | | |
|---|---|---|---|---|
| CN | 109577406 A | | 4/2019 | |
| CN | 110671538 A | | 1/2020 | |
| CN | 210890364 U | | 6/2020 | |
| EP | 0581357 A1 * | | 2/1994 | .............. E02F 5/107 |
| GB | 2163198 A * | | 2/1986 | .............. E02F 5/105 |
| GB | 2357134 A | | 6/2001 | |
| JP | 2003139272 A | | 5/2003 | |

\* cited by examiner

UNDERWATER LAYING DEVICE FOR OFFSHORE OIL AND GAS PIPELINES AND LAYING METHOD THEREOF

CROSS-REFERENCE TO RELATED APPLICATIONS

The present application is the U.S. national stage application of International Application No. PCT/CN2020/118020, filed Sep. 27, 2020, which claims priority to Chinese Patent Application No. 201911075157X, filed Nov. 6, 2019, the contents of which are incorporated herein by reference in their entireties.

BACKGROUND OF THE INVENTION

Field of the Invention

The present invention relates to the field of offshore engineering, and in particular, to an underwater laying device for offshore oil and gas pipelines and a laying method thereof.

Description of Related Art

With the rapid development of the society, the demand for oil, natural gas, and other resources increasingly grows. Offshore pipeline transportation, as one of importance resource transportation methods, also develops rapidly. Therefore, there is an increasingly higher requirement for the development of underwater laying technology of offshore pipelines.

The underwater pipeline-laying operation mainly requires two processes: trenching and pipeline burying; and is completed mainly by using underwater robots at present. Since China started this technology late, some advanced technologies related to the underwater robots are mainly in hands of foreign countries such as the United States, South Korea, Norway, etc., which grasp relatively advanced offshore engineering technologies. Therefore, we need to purchase or lease underwater robots for the underwater pipeline-laying operation, which undoubtedly brings a huge expense. Although we have been developing devices that can replace the underwater robot, it is difficult to realize industrialization due to the complexity of the technology. Therefore, it is in urgent need to develop a mass-producible apparatus which can replace the underwater robot.

SUMMARY OF THE INVENTION

Technical Problem

Invention objective: In view of the foregoing problems, the present invention aims to provide an underwater laying device for offshore oil and gas pipelines and a laying method thereof, where the device is mass-producible and can replace the existing underwater robot for trenching and pipeline burying.

Technical Solution

An underwater laying device for offshore oil and gas pipelines is provided, including: a box-shaped main body, a first mud-plowing rake, a first mud-plowing hoe, a second mud-plowing rake, a second mud-plowing hoe, propellers, a mud collection hood, an elongated pipeline-delivery cylinder, a mud delivery plate, and a control system, where the box-shaped main body has an opening facing downwards; the first mud-plowing rake, the first mud-plowing hoe, the second mud-plowing rake, and the second mud-plowing hoe tilt in the same direction on the bottom of the box-shaped main body along its length direction, and are arranged at intervals and separately fixed on the bottom of the box-shaped main body; the first mud-plowing rake and the first mud-plowing hoe are equal in height, the second mud-plowing rake and the second mud-plowing hoe are equal in height, and the vertical height of the second mud-plowing rake is greater than that of the first mud-plowing rake; the propellers are mounted respectively at two sides opposite in the length direction of the box-shaped main body on its front end; the mud collection hood has an opening facing downwards, is fixed to the rear end of the box-shaped main body and is communicated with the inside thereof; the elongated pipeline-delivery cylinder diagonally penetrates the box-shaped main body along the length direction of the box-shaped main body; the mud delivery plate is fixed on the bottom of the box-shaped main body, and spans between the first mud-plowing hoe and the second mud-plowing hoe; and the control system is mounted on the box-shaped main body, and the propellers are in signal connection with the control system.

The box-shaped main body is a steel cuboid.

Further, the control system includes a pre-filter, a digital signal processor, an output filter, and pressure sensors, where the pre-filter, the digital signal processor, and the output filter are integrated on the upper portion of the box-shaped main body; the pre-filter and the output filter are separately in signal connection with the digital signal processor, and the output filter is in signal connection with motion controllers of the propellers; and there are two pressure sensors, one of which is mounted on the bottom of the first mud-plowing rake or the first mud-plowing hoe, and the other one is mounted on the bottom of the second mud-plowing rake or the second mud-plowing hoe; and the pressure sensors are in signal connection with the pre-filter.

Further, the first mud-plowing rake includes a first connecting plate and first tines; at least two first tines are arranged, and are fixed at intervals on a lateral face of the first connecting plate along its length direction; the first connecting plate is horizontally arranged, and two broad sides of the first connecting plate are respectively fixed to two inner sides opposite in the length direction of the box-shaped main body, so that the first tines are located outside the box-shaped main body; the second mud-plowing rake includes a second connecting plate and second tines; at least two second tines are arranged, and are fixed at intervals on a lateral face of the second connecting plate along its length direction; and the second connecting plate is horizontally arranged, and two broad sides of the second connecting plate are respectively fixed to two inner sides opposite in the length direction of the box-shaped main body, so that the second tines are located outside the box-shaped main body.

Preferably, the first tines and the second tines have equal numbers; and a tilting angle A formed between each first tine and the bottom side of the box-shaped main body ranges from 60° to 75°, and a tilting angle B formed between each second tine and the bottom side of the box-shaped main body is identical with the tilting angle A of the first tine.

Further, the first mud-plowing hoe includes a third connecting plate and a first hoe-plate; one end of the first hoe-plate is a sharp end and the other end is a flat end, and the flat end thereof are fixed to the third connecting plate; the plate-surface between the two ends of the first hoe-plate is a curved surface, one lateral face thereof being a concave face and the concave face being an obtuse-angle face, and the opposite other lateral face being convex; the third connecting plate is horizontally arranged, and two broad sides of the third connecting plate are respectively fixed to two inner sides opposite in the length direction of the box-shaped main body, so that the first hoe-plate is located outside the box-shaped main body; the second mud-plowing hoe includes a fourth connecting plate and second hoe-plate; one end of the hoe-plate is a sharp end and the other end is a flat end, and the flat end thereof is fixed to the fourth connecting plate; the plate-surface between the two ends of the second hoe-plate is a curved surface, one lateral face thereof being a concave face and the concave face being an obtuse-angle face, and the opposite other lateral face being convex; and the fourth connecting plate is horizontally arranged, and two broad sides of the fourth connecting plate are respectively fixed to two inner sides opposite in the length direction of the box-shaped main body, so that the second hoe-plate is located outside the box-shaped main body.

Preferably, a tilting angle C formed between the first hoe-plate and the bottom side of the box-shaped main body ranges from 60° to 75°, and a tilting angle D formed between the second hoe-plate and the bottom side of the box-shaped main body is identical with the tilting angle C of the first hoe-plate.

Further, the mud collection hood includes an arc-shaped fender and sector-shaped plates; two sector-shaped plates are disposed in parallel at an interval, and are separately fixed to the box-shaped main body; the two sector-shaped plates are connected via the arc-shaped fender, so that the arc-shaped fender and the two sector-shaped plates form a sector-shaped housing; and the arc-shaped fender is fixed to the box-shaped main body.

Further, at least two propellers are disposed on the front end of the box-shaped main body, and penetrate through and are fixed on the front end face of the box-shaped main body.

Further, at least one linear bearing is mounted on the inner wall of the elongated pipeline-delivery cylinder, and an outer rim of the linear bearing is connected to the inner wall of the elongated pipeline-delivery cylinder.

A laying method of the underwater laying device for offshore oil and gas pipelines is provided, including:
1. making laying preparation of a submarine pipeline of a reel lay type, which includes the following steps:
   S1. sleeving an elongated pipeline-delivery cylinder on the pipeline, and lowering the device by using a crane and synchronously lowering the pipeline;
   S2. receiving, by a control system, an instruction from a shipborne main control system; and transmitting a signal to propellers respectively mounted at two sides opposite in the length direction of a box-shaped main body, to trigger reverse rotation of the corresponding propellers to implement submergence of the device; and
   S3. a first mud-plowing rake, a first mud-plowing hoe, a second mud-plowing rake, and a second mud-plowing hoe sticking into the riverbed soil; and sending out, by the control system, a signal to trigger stop of rotation of the propellers respectively mounted at two sides opposite in the length direction of the box-shaped main body;
2. performing a submarine pipeline laying operation, which includes the following steps:
   T1. giving, by ship operators, an instruction to the control system by using the shipborne main control system; and giving, by the control system, an instruction to the propellers mounted on the front end of the box-shaped main body, to trigger forward rotation of the corresponding propellers to implement forward motion of the device; and
   T2. the first mud-plowing rake and the second mud-plowing rake moving forward to carry out progressive mud loosening and trenching; and the first mud-plowing hoe and the second mud-plowing hoe shoveling the mud, so that the mud gathers upwards and backwards, where some of the mud directly goes into the mud collection hood and some enters the mud collection hood via the mud delivery plate; and in this case, the pipeline being in a lowering state all the time, placing the pipeline in a trench dug by the device, and back-filling the trench in which the pipeline has been laid with the mud in the mud collection hood
3. terminating the submarine pipeline laying operation, which includes the following steps:
   P1. after the pipeline is laid to a required length, giving, by the ship operators, an instruction to the control system by using the shipborne main control system; and giving, by the control system, an instruction to the propellers mounted on the front end of the box-shaped main body, to trigger stop of rotation of the corresponding propellers;
   P2. giving, by the control system, an instruction once again to the propellers respectively mounted at two sides opposite in the length direction of the box-shaped main body, to trigger forward rotation of the corresponding propellers to implement rise of the device; and
   P3. after the device comes up to the sea surface, putting away the device.

Advantageous Effect

The present invention has the following advantages compared to the prior art: By using a steel box-shaped cuboid as the main body, the present invention gets rid of limitations of the conventional pipeline laying operation with an underwater robot. Further, by imitating the traditional farming and plowing forms, and with reference to modern offshore pipeline laying technology, submarine trenching, pipeline laying, and pipeline burying can be successively performed and all implemented by the device of the present invention. The device of the present invention has a simple structure, and overcomes the structural complexity of the conventional underwater robot on the premise of achieving the function requirements, thus greatly reducing the manufacturing cost and being mass-producible.

DETAILED DESCRIPTION OF THE INVENTION

The present invention is further described with reference to the accompanying drawings and specific embodiments. It should be understood that, these embodiments are merely used for describing the present invention rather than limiting the scope of the present invention.

Figure 1:
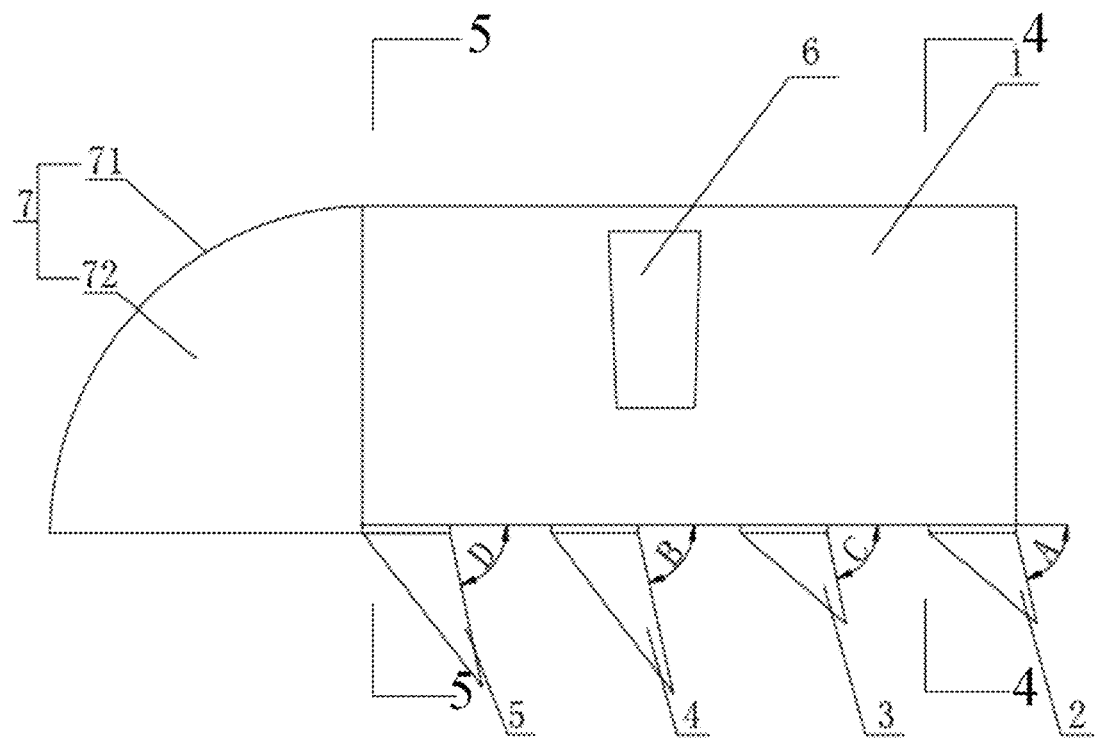
FIG. 1 is a front view of the present invention.
Figure 2:
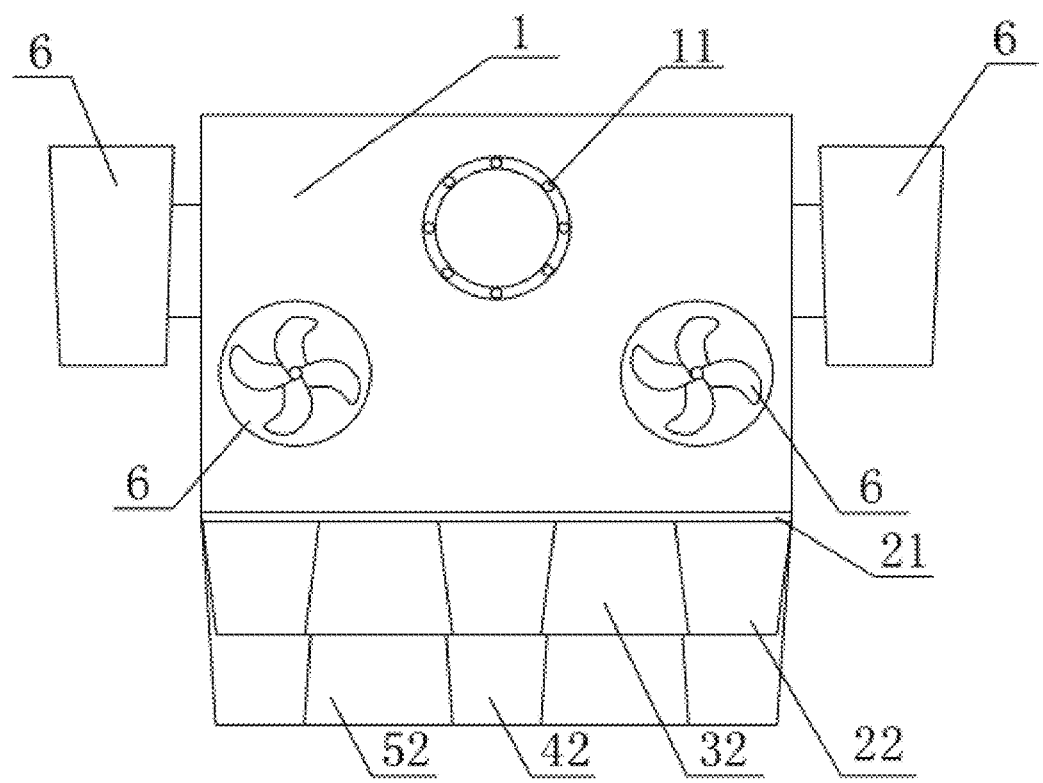
FIG. 2 is a right view of FIG. 1.
Figure 3:
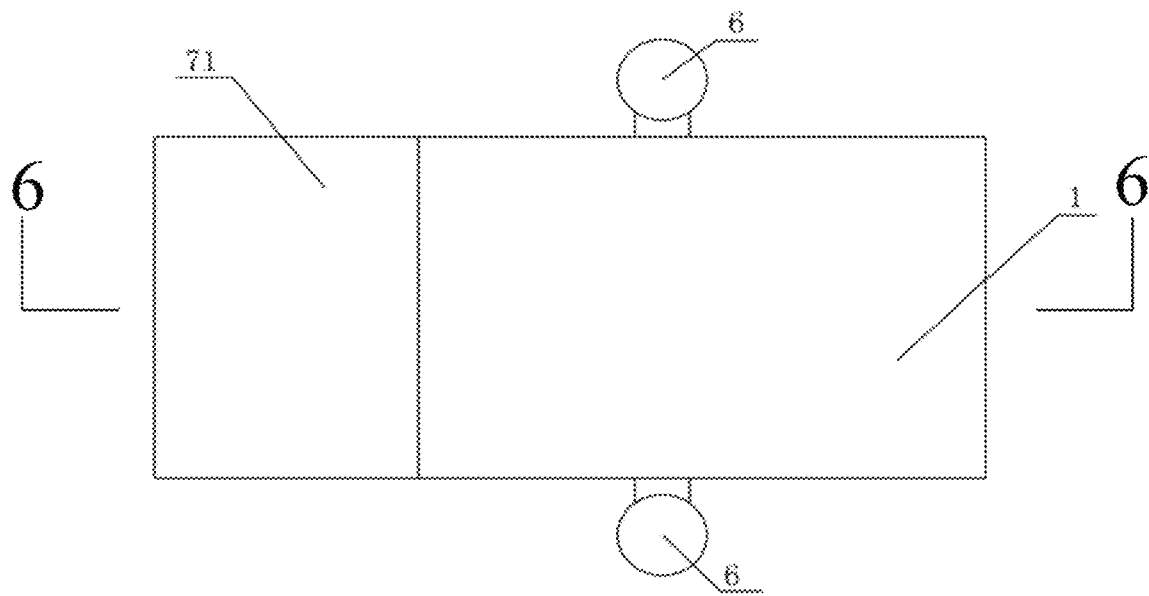
FIG. 3 is a top view of FIG. 1.
Figure 4:
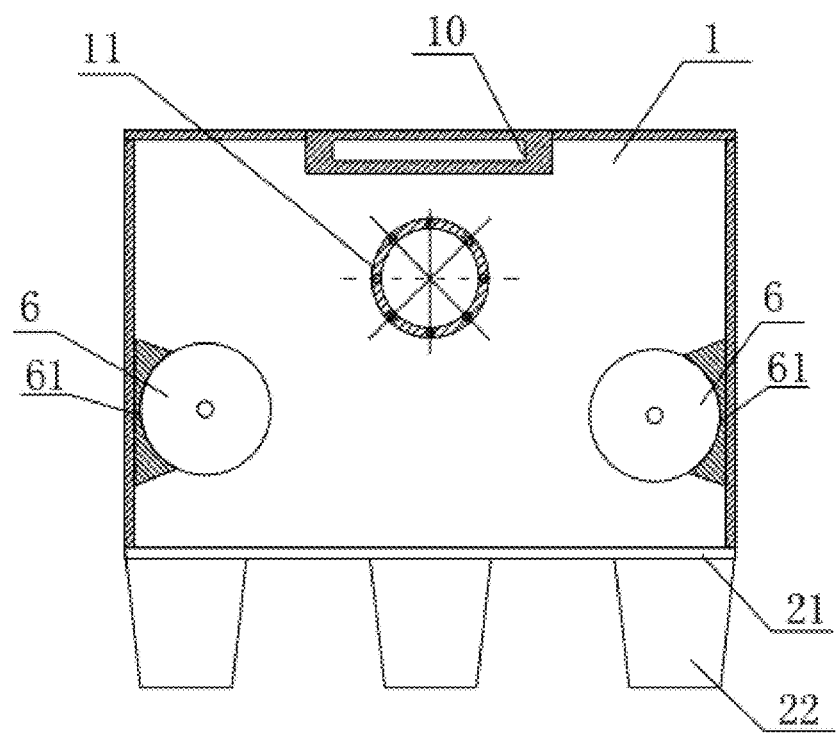
FIG. 4 is an 4-4 section view of FIG. 1.
Figure 5:
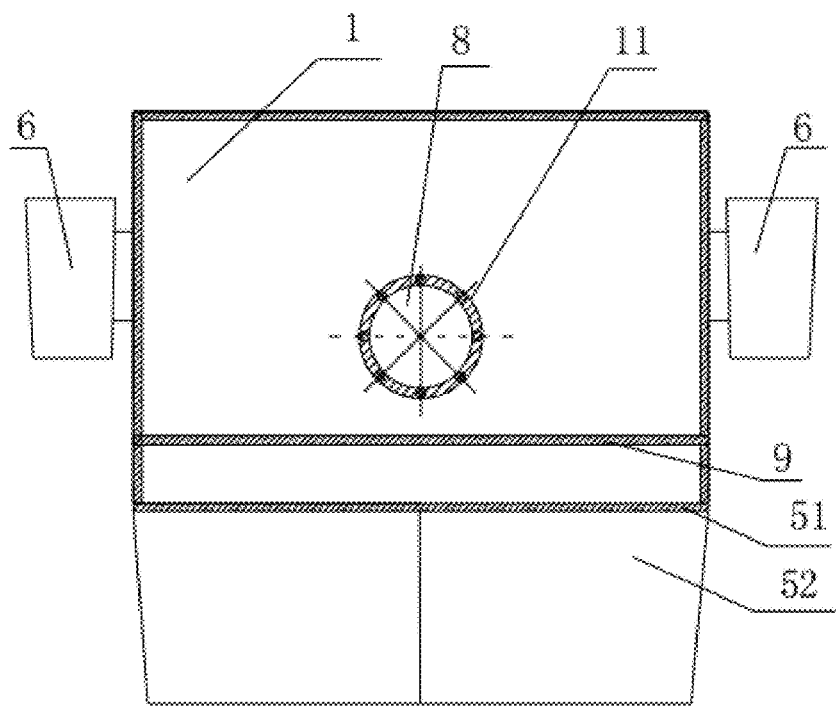
FIG. 5 is a 5-5 section view of FIG. 1.
Figure 6:
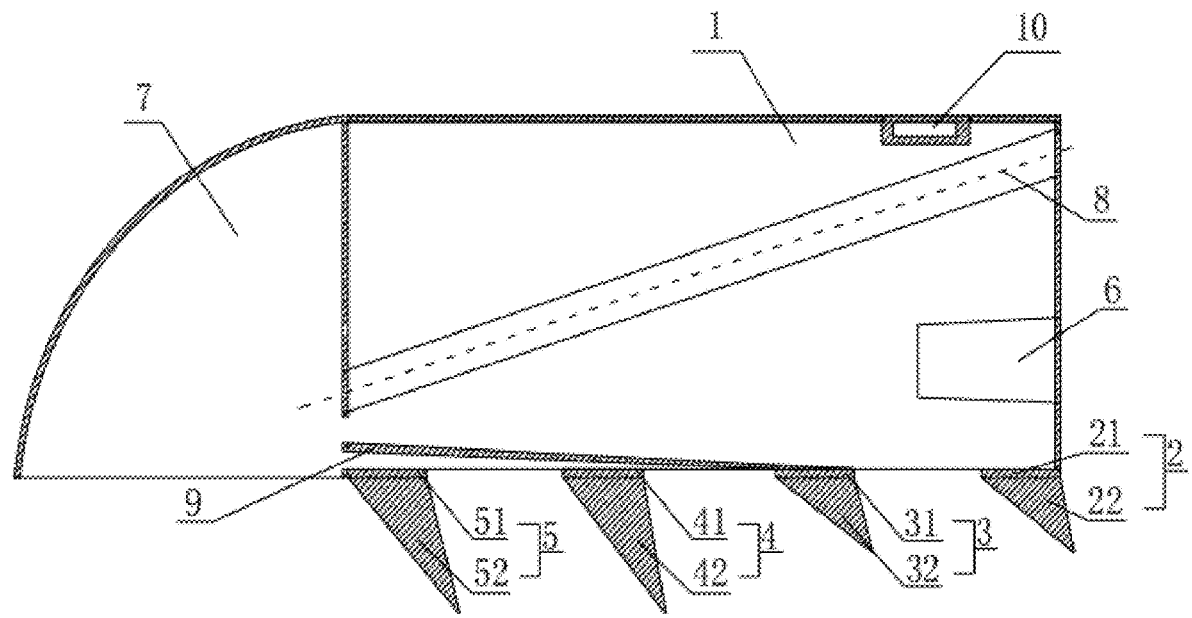
FIG. 6 is a 6-6 section view of FIG. 3.
Figure 7:
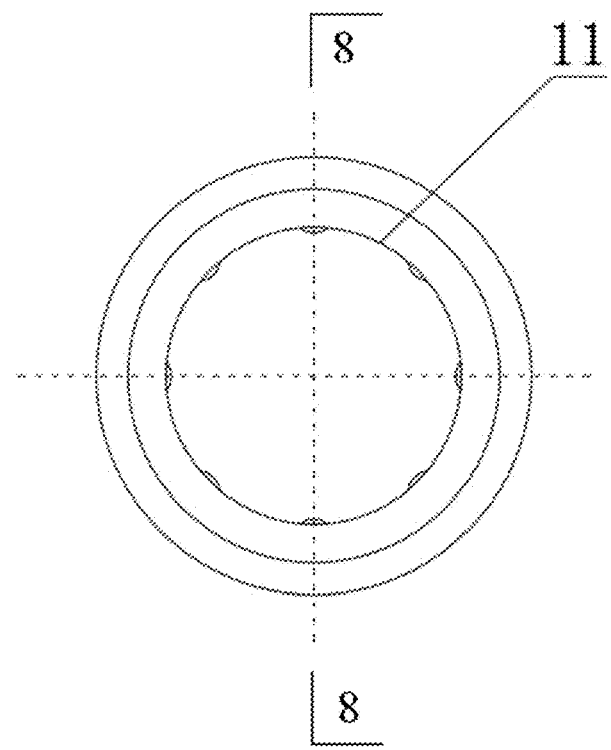
FIG. 7 is a schematic structural diagram of a linear bearing.
Figure 8:
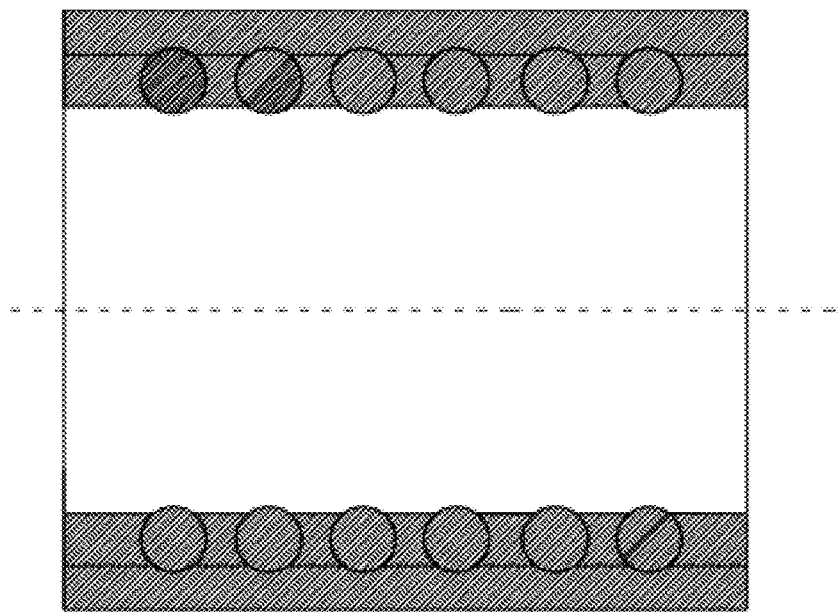
FIG. 8 is a 8-8 section view of FIG. 7.
Figure 9:
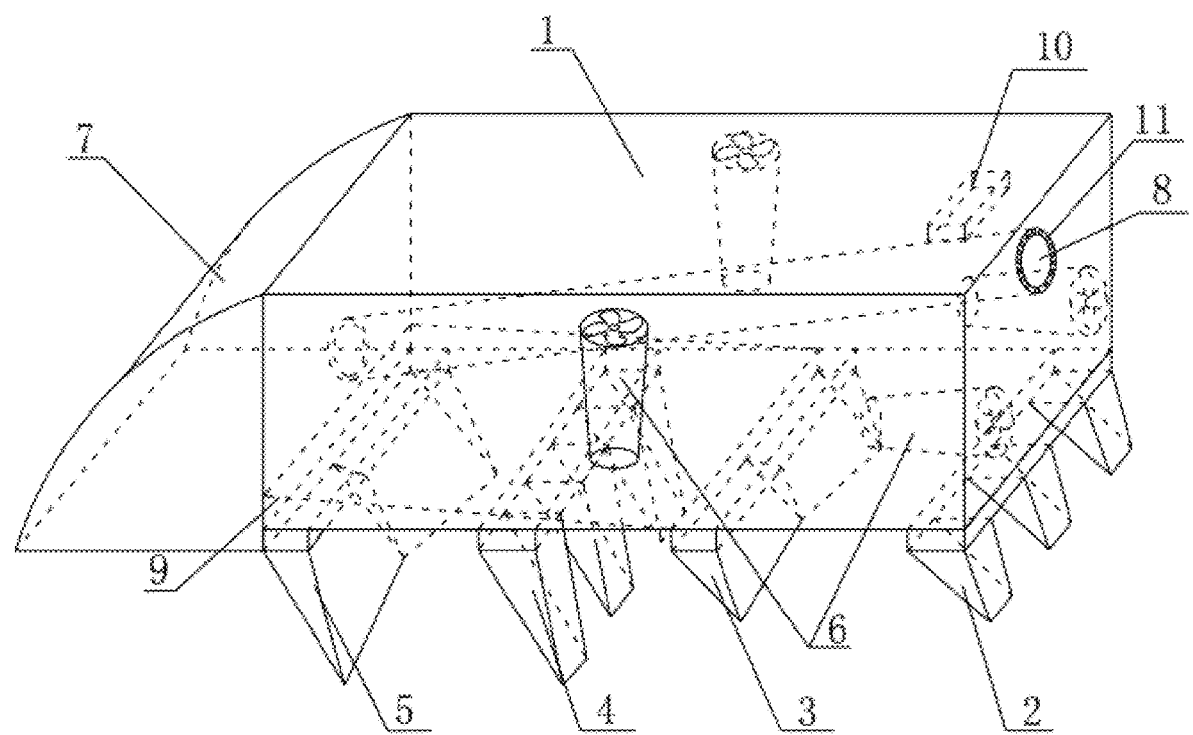
FIG. 9 is a schematic three-dimensional structural diagram of the present invention.
Figure 10:
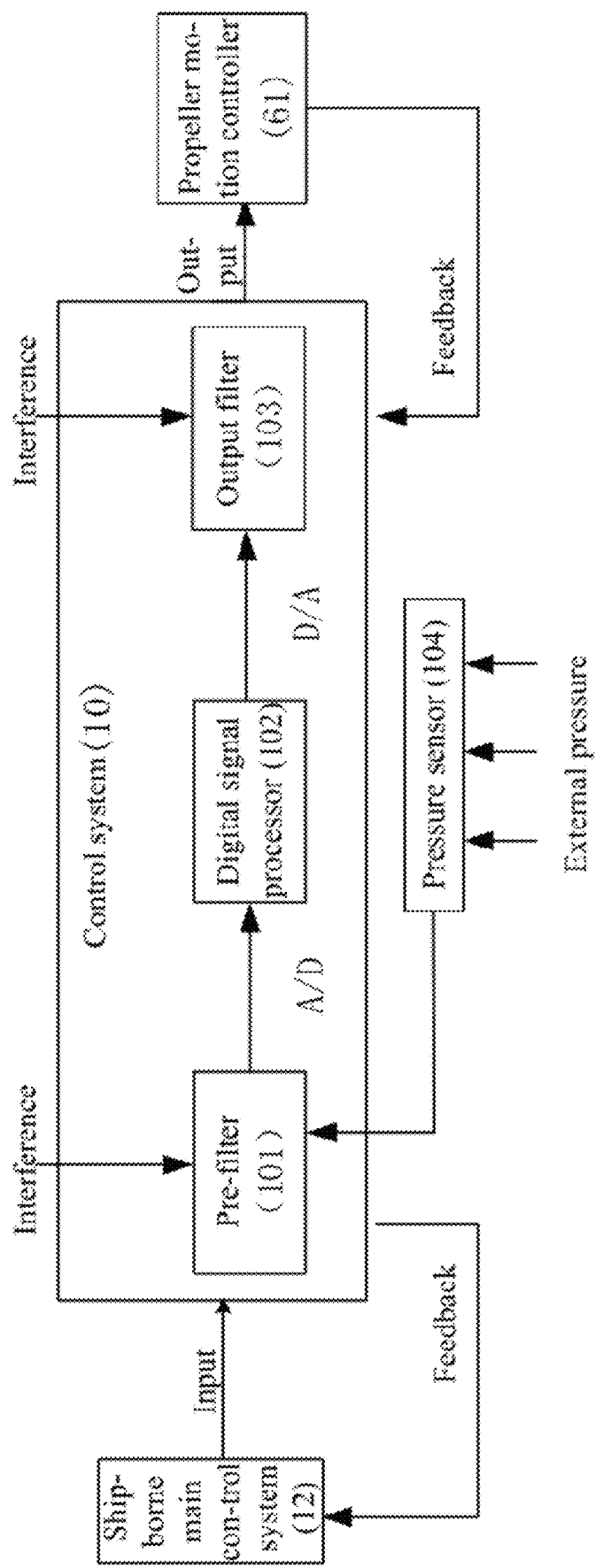
FIG. 10 is a wiring diagram of a control system of the present invention.

An underwater laying device for offshore oil and gas pipelines is provided, which, as shown from FIGS. 1 to 9, includes a box-shaped main body 1, a first mud-plowing rake 2, a first mud-plowing hoe 3, a second mud-plowing rake 4, a second mud-plowing hoe 5, propellers 6, a mud collection hood 7, an elongated pipeline-delivery cylinder 8, a mud delivery plate 9, a control system 10, and a linear bearing 11. As shown in FIG. 10, the control system 10 includes a pre-filter 101, a digital signal processor 102, an output filter 103, and pressure sensors 104.

The box-shaped main body 1 is a steel cuboid, and has an opening which faces downwards to form an upside-down shape. The first mud-plowing rake 2, the first mud-plowing hoe 3, the second mud-plowing rake 4, and the second mud-plowing hoe 5 tilt in the same direction on the bottom of the box-shaped main body 1 along its length direction, and are arranged at intervals and separately fixed on the bottom of the box-shaped main body 1. The first mud-plowing rake 2 is arranged near the front end of the box-shaped main body 1 in its length direction, and the second mud-plowing hoe 5 is arranged near the rear end of the box-shaped main body 1 in its length direction. The first mud-plowing rake 2 and the first mud-plowing hoe 3 are equal in height, that is, their bottom ends are flush. The second mud-plowing rake 4 and the second mud-plowing hoe 5 are equal in height, that is, their bottom ends are flush. The vertical height of the second mud-plowing rake 4 is greater than that of the first mud-plowing rake 2. The first mud-plowing rake 2 includes a first connecting plate 21 and first tines 22. At least two, for example, three, first tines 22 are arranged, and are fixed at intervals on a lateral face of the first connecting plate 21 along its length direction, so that sharp ends of the first tines 22 are far away from the first connecting plate 21. The first connecting plate 21 is horizontally arranged and spans in the width direction of the box-shaped main body 1; and two broad sides of the first connecting plate are respectively fixed to two inner sides opposite in the length direction of the box-shaped main body 1, so that the first tines 22 face downwards and are located outside the box-shaped main body 1. A tilting angle A formed between each first tine 22 and the bottom side of the box-shaped main body 1 ranges from 60° to 75°, and these first tines 22 have equal tilting angles A. The second mud-plowing rake 4 includes a second connecting plate 41 and second tines 42. The second tines 42 have an equal number with the first tines 22, and are fixed at intervals on a lateral face of the second connecting plate 41 along its length direction, so that sharp ends of the second tines 42 are far away from the second connecting plate 41. The second connecting plate 41 is horizontally arranged and spans in the width direction of the box-shaped main body 1; and two broad sides of the second connecting plate are respectively fixed to two inner sides opposite in the length direction of the box-shaped main body 1, so that the second tines 42 are located outside the box-shaped main body 1. A tilting angle B formed between each second tine 42 and the bottom side of the box-shaped main body 1 is identical with the tilting angle A of the first tine 22.

The first mud-plowing hoe 3 includes a third connecting plate 31 and a first hoe-plate 32. One end of the hoe-plate 32 is a sharp end and the other end is a flat end, and the flat ends thereof are fixed to the third connecting plate 31. The plate-surface between the two ends of the first hoe-plate 32 is a curved surface, where one lateral face thereof is a concave face and the concave face is an obtuse-angle face, and the opposite other lateral face is a convex face. The third connecting plate 31 is horizontally arranged and spans in the width direction of the box-shaped main body 1; and two broad sides of the third connecting plate are respectively fixed to two inner sides opposite in the length direction of the box-shaped main body 1, so that the sharp ends of the first hoe-plate 32 face downwards and is located outside the box-shaped main body 1. A tilting angle C formed between the first hoe-plate 32 and the bottom side of the box-shaped main body 1 ranges from 60° to 75°. The second mud-plowing hoe 5 includes a fourth connecting plate 51 and a second hoe-plate 52. One end of the second hoe-plate 52 is a sharp end and the other end is a flat end, and the flat ends thereof are fixed to the fourth connecting plate 51. The plate-surface between the two ends of the second hoe-plate 52 is a curved surface, where one lateral face thereof is a concave face and the concave face is an obtuse-angle face, and the opposite other lateral face is a convex face. The fourth connecting plate 51 is horizontally arranged and spans in the width direction of the box-shaped main body 1; and two broad sides of the fourth connecting plate are respectively fixed to two inner sides opposite in the length direction of the box-shaped main body 1, so that the sharp ends of the second hoe-plate 52 face downwards and are located outside the box-shaped main body 1. A tilting angle D formed between each second hoe-plate 52 and the bottom side of the box-shaped main body 1 is identical with the tilting angle C of the first hoe-plate 32.

The propellers 6 are mounted on the front end of the box-shaped main body 1 and further at two sides opposite in the length direction of the box-shaped main body. At least two propellers 6 are disposed on the front end of the box-shaped main body 1 and are horizontally arranged herein. Corresponding holes are horizontally provided at intervals in the front end of the box-shaped main body 1, so that the propellers 6 herein penetrate through and are fixed on the front end face of the box-shaped main body 1. At least one propeller 6 is disposed separately at two sides opposite in the length direction of the box-shaped main body 1. The propellers 6 herein are vertically arranged and fixed to the outer lateral surface of the box-shaped main body 1.

The mud collection hood 7 includes an arc-shaped fender 71 and sector-shaped plates 72. Two sector-shaped plates 72 are disposed in parallel at an interval, and are respectively fixed to edges of the rear end of the box-shaped main body 1. The two sector-shaped plates 72 are connected via the arc-shaped fender 71, so that the arc-shaped fender 71 and the two sector-shaped plates form a sector-shaped housing. The top end of the arc-shaped fender 71 is fixed to the box-shaped main body 1, and an opening of the mud collection hood 7 faces downwards, so that the mud collection hood is fixed to the rear end of the box-shaped main body 1 and is communicated with its inside.

The elongated pipeline-delivery cylinder 8 diagonally penetrates the box-shaped main body 1 along the length direction of the box-shaped main body 1. One end of the elongated pipeline-delivery cylinder 8 passes through the box-shaped main body 1 from its front end face along the length direction and is secured; and the other end passes through the box-shaped main body 1 from the bottom of its rear end face along the length direction and is secured. The rear end face of the box-shaped main body 1 is opened at the lower part and is ¼-⅓ shorter than the front end face, so that the box-shaped main body 1 is communicated with the inside of the mud collection hood 7. At least one linear bearing 11 is mounted on the inner wall of the elongated pipeline-delivery cylinder 8, and an outer rim of the linear bearing 11 is connected to the inner wall of the elongated pipeline-delivery cylinder 8.

The mud delivery plate 9 is fixed on the bottom of the box-shaped main body 1, and spans between the first mud-plowing hoe 3 and the second mud-plowing hoe 5. One lateral side of the mud delivery plate 9 is joined to the upper surface of the first mud-plowing hoe 3, and the opposite other lateral side tilts up and extends to the opened place at the rear end of the box-shaped main body 1, so that the mud delivery plate 9 inclines at about 170° with respect to the horizontal plane. Two broad sides of the mud delivery plate 9 are respectively fixed to two inner sides opposite in the length direction of the box-shaped main body 1.

The pre-filter 101, the digital signal processor 102, and the output filter 103 are integrated on the upper portion of the box-shaped main body 1 and subjected to waterproof treatment; and an integrated circuit board is mounted to supply power to the device of the present invention. The pre-filter 101 and the output filter 103 are separately in signal connection with the digital signal processor 102, and the output filter 103 is in signal connection with motion controllers 61 of the propellers 6. There are two pressure sensors 104, one of which is mounted on the bottom of the first mud-plowing rake 2 or the first mud-plowing hoe 3 and subjected to waterproof treatment, and the other one is mounted on the bottom of the second mud-plowing rake 4 or the second mud-plowing hoe 5 and subjected to waterproof treatment. The pressure sensors 104 are in signal connection with the pre-filter 101, and the pre-filter 101 is in signal connection with a shipborne main control system 12.

The fixed connection in the device of the present invention is achieved mainly by welding.

A laying method of the above-described underwater laying device for offshore oil and gas pipelines is provided, which has the following process:

1. Laying preparation of a submarine pipeline of a reel lay type is made, which includes the following steps:
   S1. The elongated pipeline-delivery cylinder 8 is sleeved on the pipeline, and the device of the present invention is lowered by using a crane and the pipeline is lowered synchronously.
   S2: The pre-filter 101 receives an instruction from the shipborne main control system 12; and after processing by the digital signal processor 102, the output filter 103 sends a signal to motion controllers 61 of the propellers 6 respectively mounted at two sides opposite in the length direction of the box-shaped main body 1, to trigger reverse rotation of the corresponding propellers 6 to implement submergence of the device of the present invention.
   S3. The first mud-plowing rake 2, the first mud-plowing hoe 3, the second mud-plowing rake 4, and the second mud-plowing hoe 5 stick into the riverbed soil; and the pressure sensors 104 are pressed to send out a sensing signal to the pre-filter 101, and the digital signal processor 102 performs information processing. Then, the output filter 103 sends an operation stop signal to the motion controllers 61 of the corresponding propellers 6, to trigger stop of rotation of the propellers 6 respectively mounted at two sides opposite in the length direction of the box-shaped main body 1.
   S4. Information indicating that the device of the present invention has arrived at a specified place is fed back to the shipborne main control system 12 through a leader cable, so that ship operators can know an underwater status of the device.

2. A submarine pipeline laying operation is performed, which includes the following steps:
   T1. The ship operators give an instruction by using the shipborne main control system 12 to the pre-filter 101 through the leader cable; and after information processing by the digital signal processor 102, the output filter 103 gives an instruction to the motion controllers 61 of the propellers 6 mounted on the front end of the box-shaped main body 1, to trigger forward rotation of the corresponding propellers 6 to implement forward motion of the device of the present invention.
   T2. The first mud-plowing rake 2 and the second mud-plowing rake 4 move forward to carry out progressive mud loosening and trenching; and the first mud-plowing hoe 3 and the second mud-plowing hoe 5 shovel the mud, so that the mud gathers upwards and backwards. Some of the mud directly goes into the mud collection hood 7, and some enters the mud collection hood 7 via the mud delivery plate 9. In this case, the pipeline is in a lowering state all the time, and is placed in a trench dug by the device of the present invention. Further, the trench in which the pipeline has been laid is backfilled with the mud in the mud collection hood 7.
   T3. While operating, the propellers 6 send their own operating status via a signal and the pre-filter 101 in the control system 10 receives the signal. After processing by the digital signal processor 102, the processed signal is output by the output filter 103 and is fed back to the shipborne main control system 12 via the cable, so that the operators can easily know the operating status of the propellers 6.

3. The submarine pipeline laying operation is terminated, which includes the following steps:
   P1. After the pipeline is laid to a required length, the ship operators give an instruction to the pre-filter 101 by using the shipborne main control system 12; and after information processing by the digital signal processor 102, the output filter 103 gives an instruction to the motion controllers 61 of the propellers 6 mounted on the front end of the box-shaped main body 1, to trigger stop of rotation of the corresponding propellers 6.
   P2. The ship operators give an instruction to the pre-filter 101 by using the shipborne main control system 12 once again; and after information processing by the digital signal processor 102, the output filter 103 sends an instruction to the motion controllers 61 of the propellers 6 respectively mounted at two sides opposite in the length direction of the box-shaped main body 1, to trigger forward rotation of the corresponding propellers 6 to implement rise of the device of the present invention.
   P3. After coming up to the sea surface, the device of the present invention is put away.

The first tines 22 and the second tines 42 are mainly used for mud loosening and trenching, to form an early-stage trench; and the first hoe-plate 32 and the second hoe-plate 52 are then used to shovel the mud, thus completing trenching, to finally form the trench. Due to the height difference between the first mud-plowing rake 2 and the first mud-plowing hoe 3, and the second mud-plowing rake 4 and the second mud-plowing hoe 5, the depth of the formed trench progressively increases, thus implementing progressive mud loosening and trenching and further ensuring a reliable and stabile trenching operation. In this case, the pipeline is synchronously lowered to the dug trench. The mud shoveled by the first hoe-plate 32 goes into the mud collection hood 7 through the mud delivery plate 9, while the mud shoveled by the second hoe-plate 52 directly enter the mud collection hood 7 vertically along its extension direction, so that the trench in which the pipeline has been laid is backfilled with the mud and the excavated mud is reused to cover the pipeline.

During operation, water flows produced at the rear of the front-end propellers 6 flush the mud in the box-shaped main body 1 into the mud collection hood 7 by an impulsive force, preventing the accumulation of sludge inside the box-shaped main body 1.

By using a steel box-shaped cuboid as the main body, the present invention gets rid of limitations of the conventional pipeline laying operation with an underwater robot. Further, by imitating the traditional farming and plowing forms, and with reference to modern offshore pipeline laying technology, submarine trenching, pipeline laying, and pipeline burying can be successively performed and all implemented by the device of the present invention. The device of the present invention has a simple structure, and overcomes the structural complexity of the conventional underwater robot on the premise of achieving the function requirements, thus greatly reducing the manufacturing cost and being mass-producible.

In addition, the present invention is further applicable to related technical fields, such as laying of submarine cables and optical cables. There are many specific methods and ways to achieve the present invention, and the above merely describes a preferred embodiment of the present invention. It should be noted that, several improvements and modifications may be made by those of ordinary skill in the art without departing from the principle of the present invention, and these improvements and modifications should also be construed as falling within the protection scope of the present invention. Components not specified in this embodiment can be implemented with the existing technology.

What is claimed is:

1. An underwater laying device for offshore oil and gas pipelines, comprising: a box-shaped main body (1), a first mud-plowing rake (2), a first mud-plowing hoe (3), a second mud-plowing rake (4), a second mud-plowing hoe (5), propellers (6), a mud collection hood (7), an elongated pipeline-delivery cylinder (8), a mud delivery plate (9), and a control system (10), wherein the box-shaped main body (1) has an opening facing downwards; the first mud-plowing rake (2), the first mud-plowing hoe (3), the second mud-plowing rake (4), and the second mud-plowing hoe (5) tilt in same direction on bottom of the box-shaped main body (1) along its length direction, and are arranged at intervals and separately fixed on the bottom of the box-shaped main body (1); the first mud-plowing rake (2) and the first mud-plowing hoe (3) are equal in height, the second mud-plowing rake (4) and the second mud-plowing hoe (5) are equal in height, and vertical height of the second mud-plowing rake (4) is greater than that of the first mud-plowing rake (2); the propellers (6) are mounted respectively at two sides opposite in the length direction of the box-shaped main body (1) on its front end; the mud collection hood (7) has an opening facing downwards, is fixed to the rear end of the box-shaped main body (1) and is communicated with the inside thereof; the elongated pipeline-delivery cylinder (8) diagonally penetrates the box-shaped main body (1) along the length direction of the box-shaped main body (1); the mud delivery plate (9) is fixed on the bottom of the box-shaped main body (1), and spans between the first mud-plowing hoe (3) and the second mud-plowing hoe (5); and the control system (10) is mounted on the box-shaped main body (1), and the propellers (6) are in signal connection with the control system (10).

2. The underwater laying device for offshore oil and gas pipelines according to claim 1, wherein the control system (10) comprises a pre-filter (101), a digital signal processor (102), an output filter (103), and pressure sensors (104); the pre-filter (101), the digital signal processor (102), and the output filter (103) are integrated on the upper portion of the box-shaped main body (1); the pre-filter (101) and the output filter (103) are separately in signal connection with the digital signal processor (102), and the output filter (103) is in signal connection with motion controllers (61) of the propellers (6); and the pressure sensors (104) include two pressure sensors, one of which is mounted on the bottom of the first mud-plowing rake (2) or the first mud-plowing hoe (3), and another one is mounted on the bottom of the second mud-plowing rake (4) or the second mud-plowing hoe (5); and the pressure sensors (104) are in signal connection with the pre-filter (101).

3. The underwater laying device for offshore oil and gas pipelines according to claim 1, wherein the first mud-plowing rake (2) comprises a first connecting plate (21) and first tines (22); the first tines (22) include at least two first tines (22), and are fixed at intervals on a lateral face of the first connecting plate (21) along its length direction; the first connecting plate (21) is horizontally arranged, and two broad sides of the first connecting plate are respectively fixed to two inner sides opposite in the length direction of the box-shaped main body (1), so that the first tines (22) are located outside the box-shaped main body (1); the second mud-plowing rake (4) comprises a second connecting plate (41) and second tines (42); the second tines (42) include at least two, and are fixed at intervals on a lateral face of the second connecting plate (41) along its length direction; the second connecting plate (41) is horizontally arranged, and two broad sides of the second connecting plate are respectively fixed to two inner sides opposite in the length direction of the box-shaped main body (1), so that the second tines (42) are located outside the box-shaped main body (1).

4. The underwater laying device for offshore oil and gas pipelines according to claim 3, wherein the first tines (22) and the second tines (42) have equal numbers; and a tilting angle A formed between each first tine (22) and the bottom side of the box-shaped main body (1) ranges from 60° to 75°, and a tilting angle B formed between each second tine (42) and the bottom side of the box-shaped main body (1) is identical with the tilting angle A of the first tine (22).

5. The underwater laying device for offshore oil and gas pipelines according to claim 3, wherein the first mud-plowing hoe (3) comprises a third connecting plate (31) and a first hoe-plate (32); one end of the first hoe-plate (32) is a sharp end and another end is a flat end, and the flat end thereof is fixed to the third connecting plate (31); a plate-surface between the two ends of the first hoe-plate (32) is a curved surface, one lateral face thereof being a concave face and the concave face being an obtuse-angle face, and the opposite other lateral face being convex; the third connecting plate (31) is horizontally arranged, and two broad sides of the third connecting plate are respectively fixed to two inner sides opposite in the length direction of the box-shaped main body (1), so that the first hoe-plate (32) is located outside the box-shaped main body (1); the second mud-plowing hoe (5) comprises a fourth connecting plate (51) and a second hoe-plate (52); one end of the second hoe-plate (52) is a sharp end and another end is a flat end, and the flat end thereof is fixed to the fourth connecting plate (51); a plate-surface between the two ends of the second hoe-plate (52) is a curved surface, one lateral face thereof being a concave face and the concave face being an obtuse-angle face, and the opposite other lateral face being convex; and the fourth connecting plate (51) is horizontally arranged, and two broad sides of the fourth connecting plate are respectively fixed to two inner sides opposite in the length direction of the box-shaped main body (1), so that the second hoe-plate (52) is located outside the box-shaped main body (1).

6. The underwater laying device for offshore oil and gas pipelines according to claim 5, wherein a tilting angle C formed between the first hoe-plate (32) and a bottom side of the box-shaped main body (1) ranges from 60° to 75°, and a tilting angle D formed between the second hoe-plate (52) and the bottom side of the box-shaped main body (1) is identical with the tilting angle C of the first hoe-plate (32).

7. The underwater laying device for offshore oil and gas pipelines according to claim 1, wherein the mud collection hood (7) comprises an arc-shaped fender (71) and sector-shaped plates (72); the sector-shaped plates includes two, and the two sector-shaped plates are disposed in parallel at an interval, and are separately fixed to the box-shaped main body (1); the two sector-shaped plates (72) are connected via the arc-shaped fender (71), so that a sector-shaped housing is formed by the arc-shaped fender (71) and the two sector-shaped plates (72); and the arc-shaped fender (71) is fixed to the box-shaped main body (1).

8. The underwater laying device for offshore oil and gas pipelines according to claim 1, wherein at least two propellers (6) are disposed on front end of the box-shaped main body (1), and penetrate through and are fixed on the front end face of the box-shaped main body (1).

9. The underwater laying device for offshore oil and gas pipelines according to claim 1, wherein at least one linear bearing (11) is mounted on inner wall of the elongated pipeline-delivery cylinder (8), and an outer rim of the linear bearing (11) is connected to the inner wall of the elongated pipeline-delivery cylinder (8).

10. A laying method of the underwater laying device for offshore oil and gas pipelines described in claim 1, comprising:
(1) making laying preparation of a submarine pipeline of a reel lay type, which comprises the following steps:
 (S1) sleeving an elongated pipeline-delivery cylinder (8) on the pipeline, and lowering the device by using a crane and synchronously lowering the pipeline;
 (S2) receiving, by a control system (10), an instruction from a shipborne main control system (12); and transmitting a signal to propellers (6) respectively mounted at two sides opposite in the length direction of a box-shaped main body (1), to trigger reverse rotation of the corresponding propellers (6) to implement submergence of the device; and
 (S3) a first mud-plowing rake 2, a first mud-plowing hoe (3), a second mud-plowing rake (4), and a second mud-plowing hoe (5) sticking into the riverbed soil; and sending out, by the control system (10), a signal to trigger stop of rotation of the propellers (6) respectively mounted at two sides opposite in the length direction of the box-shaped main body (1);
(2) performing a submarine pipeline laying operation, which comprises the following steps:
 (T1) giving, by ship operators, an instruction to the control system (10) by using the shipborne main control system (12); and giving, by the control system (10), an instruction to the propellers (6) mounted on front end of the box-shaped main body (1), to trigger forward rotation of the corresponding propellers (6) to implement forward motion of the device; and
 (T2) the first mud-plowing rake (2) and the second mud-plowing rake (4) moving forward to carry out progressive mud loosening and trenching; and the first mud-plowing hoe (3) and the second mud-plowing hoe (5) shoveling the mud, so that the mud gathers upwards and backwards, wherein some of the mud directly goes into the mud collection hood (7) and some enters the mud collection hood (7) via a mud delivery plate (9); and in this case, the pipeline being in a lowering state all the time, placing the pipeline in a trench dug by the device, and backfilling the trench in which the pipeline has been laid with the mud in the mud collection hood (7);
(3) terminating the submarine pipeline laying operation, which comprises the following steps:
 (P1) after the pipeline is laid to a required length, giving, by the ship operators, an instruction to the control system (10) by using the shipborne main control system (12); and giving, by the control system (10), an instruction to the propellers (6) mounted on the front end of the box-shaped main body (1), to trigger stop of rotation of the corresponding propellers (6);
 (P2) giving, by the control system (10), an instruction once again to the propellers (6) respectively mounted at two sides opposite in the length direction of the box-shaped main body (1), to trigger forward rotation of the corresponding propellers (6) to implement rise of the device; and
 (P3) after the device comes up to the sea surface, putting away the device.

\* \* \* \* \*